United States Patent [19]

McClure

[11] 4,137,554
[45] Jan. 30, 1979

[54] MAGNETIC HEAD EMPLOYING FLUX INTERROGATION

[75] Inventor: Richard J. McClure, San Diego, Calif.

[73] Assignee: Eastman Technology Inc., Rochester, N.Y.

[21] Appl. No.: 835,110

[22] Filed: Sep. 21, 1977

[51] Int. Cl.² .............................................. G11B 5/34
[52] U.S. Cl. ................................................... 360/111
[58] Field of Search ............................... 360/111–113, 360/122, 125; 324/43 R, 0.5 R, 247

[56] References Cited

U.S. PATENT DOCUMENTS

| | | | |
|---|---|---|---|
| 3,239,754 | 3/1966 | Odom, Jr. et al. | 324/5 R X |
| 3,271,665 | 9/1966 | Castro et al. | 324/43 |
| 3,369,083 | 2/1968 | Clapper et al. | 360/122 X |
| 3,400,328 | 9/1968 | Penn et al. | 324/247 |
| 3,443,213 | 5/1969 | Bader et al. | 324/43 R |
| 3,829,894 | 8/1974 | Watanabe et al. | 360/111 |

Primary Examiner—John H. Wolff
Attorney, Agent, or Firm—Robert F. Cody

[57] ABSTRACT

A flux-sensitive magnetic head employs at its back part a wire having a thin single-domain magnetic film coated thereon. A sense coil wraps around the coated wire, and, in response to current passed through the coated wire, develops a voltage proportional to the flux in the head front gap.

1 Claim, 14 Drawing Figures

1. SIGNAL FLUX STRENGTH (WITH UNIFORM INTERROGATION)
2. INTERROGATION CURRENT RISE TIME (WITH CONSTANT SIGNAL FLUX STRENGTH)
3. SIGNAL FIELD FREQUENCY (WITH UNIFORM INTERROGATION, AND CONSTANT SIGNAL FLUX STRENGTH)

MAGNETIC HEAD EMPLOYING FLUX INTERROGATION

BACKGROUND OF THE INVENTION

1. Field of the Invention

This invention relates in general to magnetic heads and in particular to magnetic heads of the flux-sensitive type.

2. Description Relative to the Prior Art

The playback of recorded signals from magnetic tape, or the like, using a conventional magnetic head that is sensitive to flux rate-of-change is difficult at low recorded signal frequencies, and theoretically impossible for recorded dc signals, or when there is no relative head-to-tape speed. Various techniques have been proposed for sensing tape flux, as opposed to the rate-of-change of flux (viz. Hall-effect devices; flux gate devices; etc.). The invention, as will be described below, employs a "single domain" thin magnetic film structure, such as a wire plated with permalloy, say, to less than three microns in thickness. (The plating occurs while the wire conducts a current, thereby providing the permalloy film with an easy magnetic axis that is parallel to the circumferential skin of the wire and orthogonal to the length of the wire).

Thin film magnetometers have been described in the literature, and in a number of patents:

IEEE Transactions on Magnetics, Vol. MAG8, #1, March 1972, "Magnetic Thin-film Magnetometers for Magnetic-field Measurement";

U.S. Pat. No. 2,856,581, issued in 1958 to L. Aldredge;

U.S. Pat. No. 3,012,177, issued in 1961 to H. Mortimer;

U.S. Pat. No. 3,239,754, issued in 1966 to W. Odom, Jr.; and

U.S. Pat. No. 3,271,665, issued in 1966 to P. Castro.

Despite widespread knowledge of thin magnetic films, no known use of such a film in connection with a magnetic head for the playback of magnetically recorded signals has been indicated, let alone the specific teachings of the invention.

SUMMARY OF THE INVENTION

The invention teaches the use, in the back section of a magnetic head, of a wire having a thin single domain magnetic coating thereon, the coating having an "easy-axis" which is circumferential about the wire and orthogonal to the length of the wire. A sense coil wraps around the magnetically coated wire; and an interrogation current (ac; pulsed) is passed through the core of the coated wire. In the absence of a field sensed by the front gap of the head, the dipoles of the coating switch, in one form of the invention, their orientations incoherently in response to the interrogation current. In the presence of a field at the front gap of the head, however, the dipoles switch coherently in a direction dependent on the sense of the field at the head front gap. Incoherent dipole switching produces no signal in the sense coil, whereas coherent switching does.

In a presently preferred form of the invention, virtually distortionless replay of taped information is provided by appropriately biasing the dipoles of the film in the direction of their hard axes, whereby in response to a pulsed interrogation current through the plated wire, the dipoles tilt to-and-fro with respect to their biased orientations, thereby producing signal current in the sense coil.

The invention will be further described with reference to the figures, wherein.

Figure 1A:
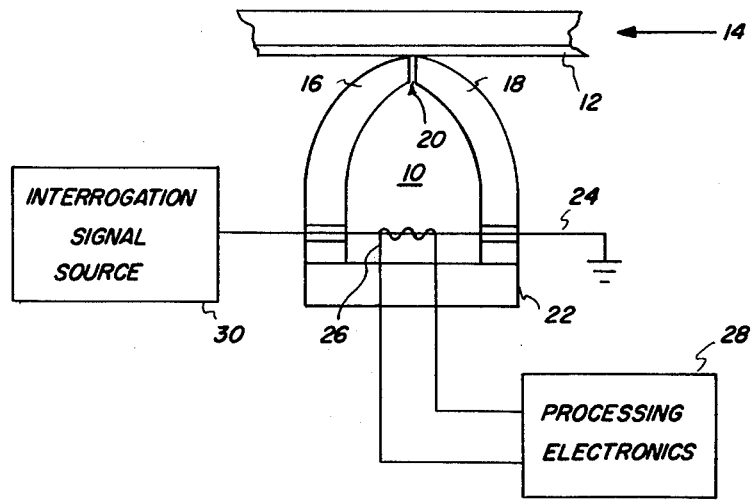
FIG. 1A is a schematic diagram of one implementation of the invention.
Figure 1B:
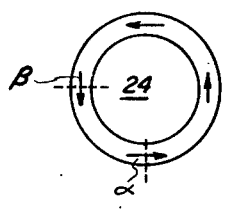
FIGS. 1b and 1c are diagrams useful in explaining a concept of the invention.
Figure 1C:
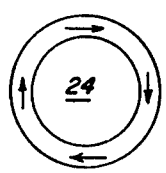
Figure 2:
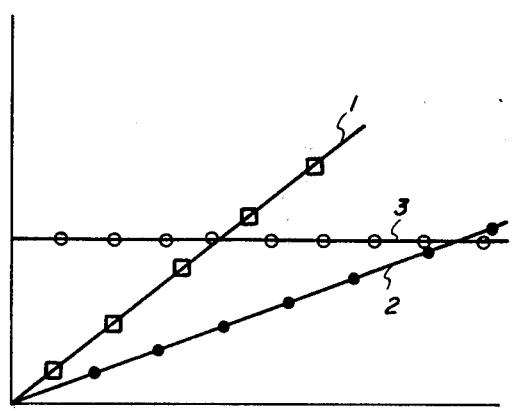
Figure 3A:
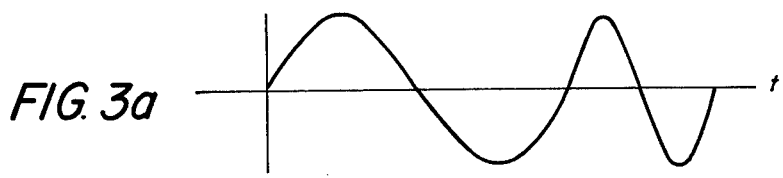
Figure 3B:
Figure 3C:
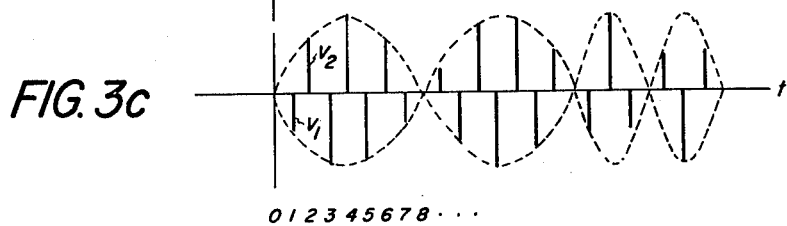
Figure 4:
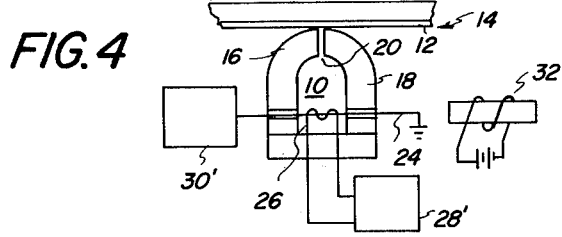
Figure 5:
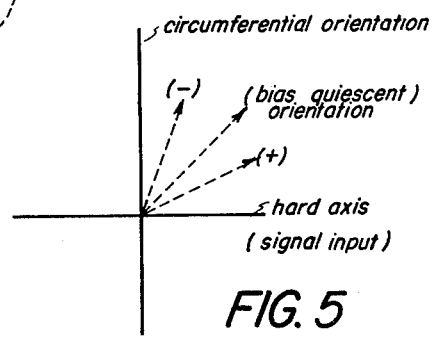
Figure 6A:
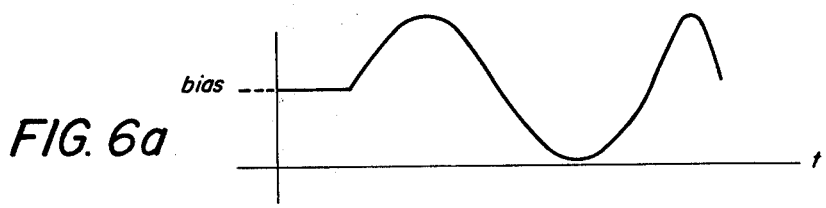
Figure 7:
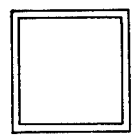
Figure 6B:
Figure 6C:
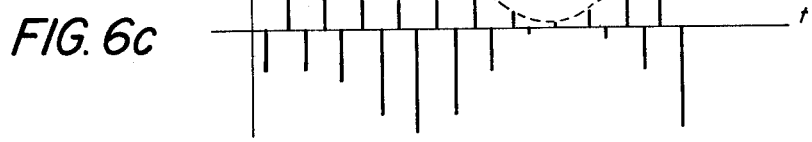
Figure 8:

FIG. 2 is a diagram illustrating performance characteristics of apparatus embodying the invention, FIGS. 3a, 3b and 3c are diagrams useful in explaining the operation of the embodiment of FIG. 1, FIG. 4 is a schematic diagram of another embodiment of the invention, FIGS. 5, 6a, 6b and 6c are diagrams useful in explaining the operation of the embodiment of FIG. 4, and FIGS. 7 and 8 illustrate magnetically coated wire cross-sections.

Referring to FIG. 1, a magnetic head 10 according to the invention coacts with the magnetic coating 12 on a message-carrying medium such as tape 14. The magnetic head 10 has pole pieces 16, 18 which define a transducer gap 20. The pole pieces 16, 18 are supported by a non-magnetic back bar 22; and the pole pieces are bridged by a wire 24 having a thin, single domain, magnetic coating thereon. As noted above, the coating is applied to the wire 24 while a current is passed through it. Preferably, the coating is of a high permeability material such as permalloy.

A sense coil 26 is wrapped about the wire 24, and cooperates with processing electronics 28; and a source 30 of interrogation signals is connected to pass current through the wire 24.

Before going into specific workings of the invention it is thought best to consider in general what goes on in a head according to the invention: Assuming an interrogation signal (source 30) such as a train of alternating pulses sufficient to switch, back-and-forth, the orientations (electron spins) of the dipoles in its thin magnetic film is applied to the wire 24 (see FIGS. 1b and 1c), little or no signal is developed in the sense coil 26 when the head 10 is not in contact with the tape 14. This is because, in such a situation, the dipoles switch incoherently back-and-forth . . . e.g., the dipole $\alpha$ of FIG. 1b switches by rotating out of page, whereas the dipole $\beta$ switches by rotating into the page . . . and attendantly the two incremental voltages buck, and preclude the sense coil from developing a resultant voltage.

With the head 10 in contact with the tape 14, however, flux emanating from the tape coating 12 enters the pole piece 16, traverses the magnetic film on the wire 24 and re-enters the tape coating 12 via the pole piece 18. The flux which traverses the thin magnetic film biases the dipoles (electron spins) so that, depending on the amount of such flux, film dipoles switch coherently (e.g., FIG. 1b dipoles $\alpha$ and $\beta$ rotate together into the page, and then together out of the page) in response to interrogation signals. Since the dipole-produced incremental voltages do not buck, the sense coil 26 produces a resultant voltage commensurate with the degree of dipole switching coherence which, in turn, is proportional to the tape flux entering the head 10.

Reference should now be had to FIG. 2: Assuming uniform interrogation, say, by a constant frequency, constant amplitude alternating current applied to the wire, the signal induced in the sense coil is linearly related (curve 1) to the amount of flux entering the head 10 at its gap 20, evidencing that the degree of coherence of dipole switching depends on signal flux strength. Assuming next that the flux entering at the head gap 20 is constant, the signal induced in the sense coil 26 is linearly related (curve 2) to the rise time of the interrogation signal. Thus, all things being equal, a square wave interrogation signal with steep rise time will produce a larger induced signal in the sense coil 26 than will a sawtooth or sine wave interrogation signal. And, (assuming the tape 14 is moving relative to the head 10) with a constant amplitude, constant frequency interrogation signal applied to the wire 24, and flux signals of constant amplitude, but of varying frequency applied to the head gap 20, the signal induced in the sense coil 26 is flat (curve 3) with frequency.

With the above as background, consider the tape 14 in motion past the head gap 20 and causing the head gap 20 to see flux that is changing in amplitude and polarity as depicted in FIG. 3a. And consider an interrogation signal, as depicted in FIG. 3b, applied to the wire 24, the interrogation signal being at a frequency that satisfies the Nyquist criterion (viz, is at least twice the highest frequency to be recovered from the tape 14) and, in the embodiment under discussion, is of an amplitude a, -a sufficient to reverse the dipole polarities in the magnetic film of the wire 24. At time t=0, the instantaneous amplitude of the tape signal flux is zero (FIG. 3a), and in response to the interrogation signal (FIG. 3b) the dipoles of the thin magnetic film on the wire 24 are switched incoherently, say, to an orientation as appears in FIG. 1b. At time t=1, in response to the interrogation signal (FIG. 3b), the dipoles of the thin magnetic film switch to an orientation as appears in FIG. 1c, such switching having a degree of coherence as dictated by the instantaneous amplitude of the signal flux (FIG. 3a) at time t=1. Such coherent switching of the film dipoles causes a voltage spike (FIG. 3c, $V_1$) to occur in the sense coil 26 at time t=1, the amplitude of the spike being in proportion to the degree of coherent dipole switching in the film. At time t=2, with the signal flux instantaneous amplitude greater than at time t=1, and with the interrogation signal causing the film dipoles to switch as in FIG. 1b, the degree of coherent switching is greater than at t=1, and causes a voltage spike (FIG. 3c, $V_2$) to occur in the sense coil 26 at time t=2. Such switching and spike producing continues until time t=8, at which time the sense of the spikes reverses, this being because of a reversal of the switching bias caused by the signal flux (FIG. 3a) which is applied to the film dipoles. Thereafter, the above continues regardless of the frequency of the signal flux (FIG. 3a).

To be noted is that the FIG. 3c voltage spikes developed by the sense coil 26 have an envelope akin to that of an amplitude modulated wave. By applying such signals to processing electronics 28, the original signal of FIG. 3a may be recovered. That is, the processing electronics 28 may include a rectifier for removing, say, the negative going portion of the wave form of FIG. 3c; a low pass filter for forming the envelope of the positive going FIG. 3 voltage spikes; and a frequency divider for halving the output of the filter (which output is twice the frequency of the flux signal appearing in FIG. 3a) or other means known to those skilled in the art of electronic sampling.

The system of FIG. 1, it will be appreciated, contemplates dipole switching as depicted in FIGS. 1b, 1c. In another form of the invention, which requires simpler processing electronics 28, the dipoles do not reverse orientation, but rather—in response to signal flux—move more or less toward or away from a quiescent orientation established by "hard axis" magnetic bias source. See FIG. 4 in which the structure of FIG. 1 is complemented by a bias field produced by an electromagnet 32. Such a bias field causes the dipoles (α β, FIG. 1b) to orient within the thin film about their axes (depicted as dashed lines in FIG. 1b) and, in response to signal flux, they tilt more or less away from their bias-produced orientations. See FIG. 5 which graphically illustrates the quiescent dipole orientation caused by the electromagnet 32. Without the magnetic energy of the electromagnet 32, the dipoles have an orientation as depicted, say, in FIG. 1b (the ordinate of FIG. 5); in response to the hard axis energy of the electromagnet 32, however, the dipoles assume the "bias" quiescent orientation. Then, in response to signal flux entering the head 10 at its gap 20, the orientation tilts more or less between the ordinate and abscissa of FIG. 5, the number of dipoles experiencing such tilting being in proportion to the magnitude of the flux signal.

Consider now, in connection with the hardware of FIG. 4, the algebraic summation of hard axis signal flux and bias flux as depicted in FIG. 6a. As the tape of FIG. 4 moves past the head 10, no signal flux enters the head gap 20 until time t=4; from time t=0 to time t=4 only the bias flux tilts the film dipole orientations.

At time t=0, in response to a positive interrogation pulse (FIG. 6b) a number (proportional to the amount of bias) of dipoles reorient, producing a positive going spike voltage (FIG. 6c) in the sense coil 26. At time t=1, when the interrogation pulse ends, a negative going spike pulse appears across the sense coil 26. Such positive and negative going spike voltages repeat until time t=4, at which time the spike voltages follow amplitude-wise the signal flux entering the head gap 20. By use of a rectifier and appropriate filter in the processing electronics 28', a signal corresponding to the tape recorded signal may be produced.

The invention has been described in detail with particular reference to certain preferred embodiments thereof, but it will be understood that variations and modifications can be effected within the spirit and scope of the invention. For example, although for ease of description, the magnetically coated wire 24 has been contemplated as having a circular cross-section, it is within the scope of the invention to employ wire having cross-sections, say, as indicated in FIGS. 7 and 8, etc.

What is claimed is:

1. A magnetic head adapted to produce a signal corresponding to a sensed level of magnetic flux, comprising:
    a. first and second magnetic pole pieces, and means structurally cooperating with said pole pieces so that they define a non-magnetic transducer gap therebetween;
    b. an elongated electrical conductor secured to and extending between the pole pieces remote from said transducer gap, said conductor having a thin single domain film of magnetic material less than 3 microns in thickness coated thereon, said film forming a closed magnetic path about the longitudinal axis of said conductor; and
    c. a coil inductively coupled to said conductor, said thin film covering the outer skin of said conductor, and said film having an easy axis of magnetization which is substantially in the plane of said film and which axis is substantially orthogonal to the length of said conductor, said conductor including means for applying a current having an alternating component passed therethrough, whereby said coil produces a modulated signal, the modulation of which corresponds to the level of flux traversing said pole pieces.

* * * * *